INVENTOR:
Charles Wilkin Johnstone

Jan. 21, 1958  C. W. JOHNSTONE  2,820,895
PULSE HEIGHT ANALYZER
Filed Oct. 28, 1953  2 Sheets-Sheet 2

WITNESSES:

INVENTOR:
Charles Wilkin Johnstone
BY
Attorney

United States Patent Office 2,820,895
Patented Jan. 21, 1958

2,820,895

PULSE HEIGHT ANALYZER

Charles Wilkin Johnstone, Los Alamos, N. Mex., assignor to the United States of America as represented by the United States Atomic Energy Commission Application October 28, 1953, Serial No. 388,930

5 Claims. (Cl. 250—27)

This invention relates to electrical pulse height analyzers and more specifically to a simplified anticoincidence circuit for such analyzers.

The electrical pulse height analyzer is a well-known device in the prior art for separating and counting pulses of selected amplitude which occur along with a greater number of pulses of various amplitudes. The multi-channel analyzer of the prior art comprises a plurality of channels in which each observed pulse triggers only the channel corresponding to the amplitude of that particular pulse. Pulse counts derived from each channel are recorded, and a plot of the quantitized data constitutes a pulse-amplitude spectrum.

The single channel pulse height analyzer must determine whether or not a pulse has crossed a selected lower level of amplitude, and whether or not the pulse has crossed the selected upper boundary. Such analyzers are described, for example by Van Rennes in the magazine Nucleonics for August 1952, the information therein being incorporated herein by reference. In such analyzers it is the usual arrangement for the lower level crossing to generate an output pulse unless it is prevented from doing so if the upper level is also crossed. The upper selected amplitude level and lower selected amplitude level between them define what is known in the art as a window. The lower level crossing signal and the upper level crossing signal are usually obtained from two voltage discriminators, one of which responds to the lower crossing and the other of which responds to the upper crossing.

In order that a pulse be counted only if its amplitude is within the window height, the voltage discriminator which responds to the lower level crossing must have its output inhibited by the upper voltage discriminator if there is an upper level crossing. A problem exists in obtaining the inhibiting action from the upper level discriminator because the pulse which triggers both the lower and upper level discriminators appears later and terminates earlier at the upper discriminator than it does at the lower discriminator. Various schemes which are rather complicated exist for preventing the lower discriminator from generating an output pulse during the interval in which the observed pulse has not reached the upper level discriminator.

In general, the anticoincidence circuits of the prior art for preventing a signal from being generated by the lower level discriminator by a pulse which also reaches the upper discriminator involve a gating or blocking action.

For example, in the circuit on page 23 of the Nucleonics for August 1952, the anticoincidence circuit depends upon the delay obtainable by differentiating the square wave output of a lower discriminator univibrator by a network including a delay line. The positive pulse obtained from the trailing edge of the univibrator pulse is therefore delayed with respect to the leading edge and body of the original square wave. The upper discriminator univibrator generates a pulse substantially simultaneously with the original square pulse in the lower discriminator and it follows that this pulse occurs earlier than the positive pulse derived from differentiating the lower discriminator square wave pulse. The upper discriminator univibrator square pulse causes the bias on an output amplifier connected in the output of the lower discriminator to rise to cut-off. This cut-off bias exceeds the lower discriminator differentiated positive pulse. Consequently, in effect, when the upper level discriminator is reached by a pulse it gates off a mixer tube in the output of the lower discriminator.

Although the anticoincidence circuits of the prior art are effective and reliable, a large number of components are utilized and complex circuitry results therefrom. In some cases, where a spectrum of extensive amplitude width is to be analyzed, as many as eighteen channels are utilized. Such an arrangement involves the use of large numbers of thermionic tubes with increasing expense and probability of failure. In addition, large numbers of thermionic tubes create an anode power problem as well as serious cooling and ventilation problems.

It follows that it is a prime object of this invention to provide a simplified anticoincidence circuit.

This and other objectives will become apparent as the description proceeds with reference to the figures of the drawing which are made a part of this specification. In the drawing.

Figure 1:
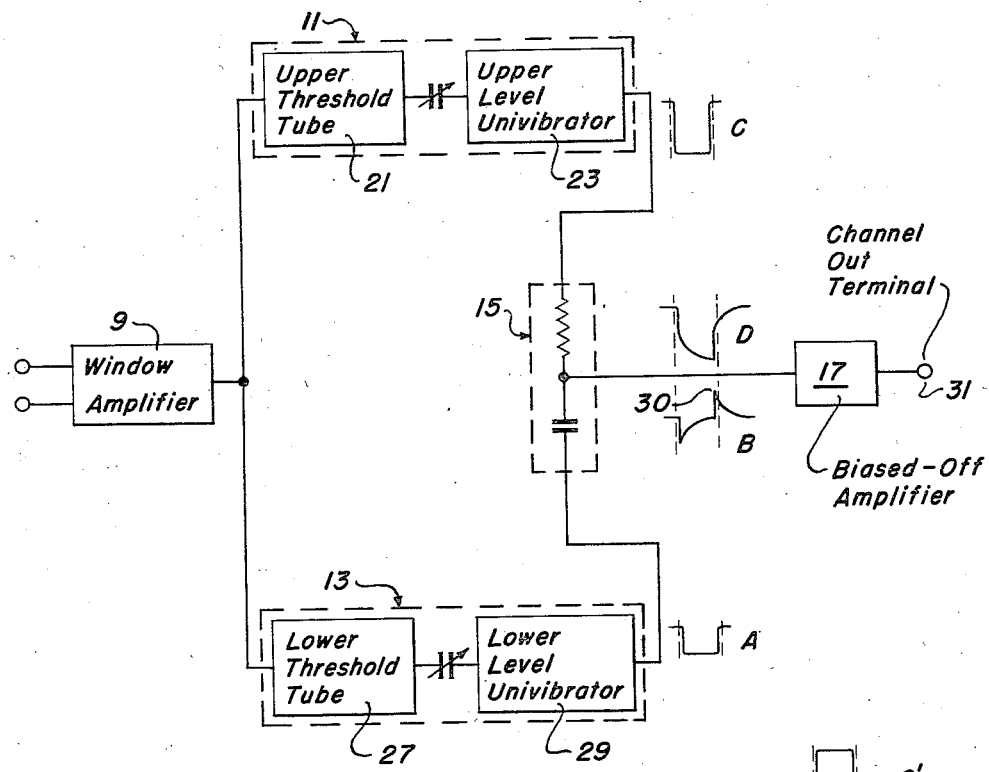
Figure 1 is a block schematic of a single channel analyzer utilizing the anticoincidence circuit of this invention.

Referring to the drawing, Figure 1, the pulse height analyzer is shown in greatly simplified form. The system essentially comprises an input expander or window amplifier 9. The output of the amplifier is coupled to an upper level discriminator 11 and a lower level discriminator 13. The output of both discriminators is coupled through a differentiating network 15 to a biased-off amplifier 17.

The biased-off amplifier can generate an output pulse only if a positive pulse is impressed on its input. If an input pulse passes the lower discriminator only, a negative square wave as shown by waveform A is generated by the lower discriminator. This square wave is differentiated and as a result is converted into a negative and a positive pulse as shown by waveform B. The positive pulse activates the biased-off amplifier which generates an output pulse.

If the upper discriminator is also reached by the input pulse, a second negative square wave pulse of greater height and preferably at least twice the height of the lower discriminator square wave is generated as shown in waveform C by the upper discriminator and this square wave is mixed with and depresses the output of the lower level discriminator. It is seen that the resulting positive differentiated pulse is as shown in waveform D and does not reach a positive value. Consequently, the biased-off amplifier is not activated and no output pulse is generated.

Figure 2:
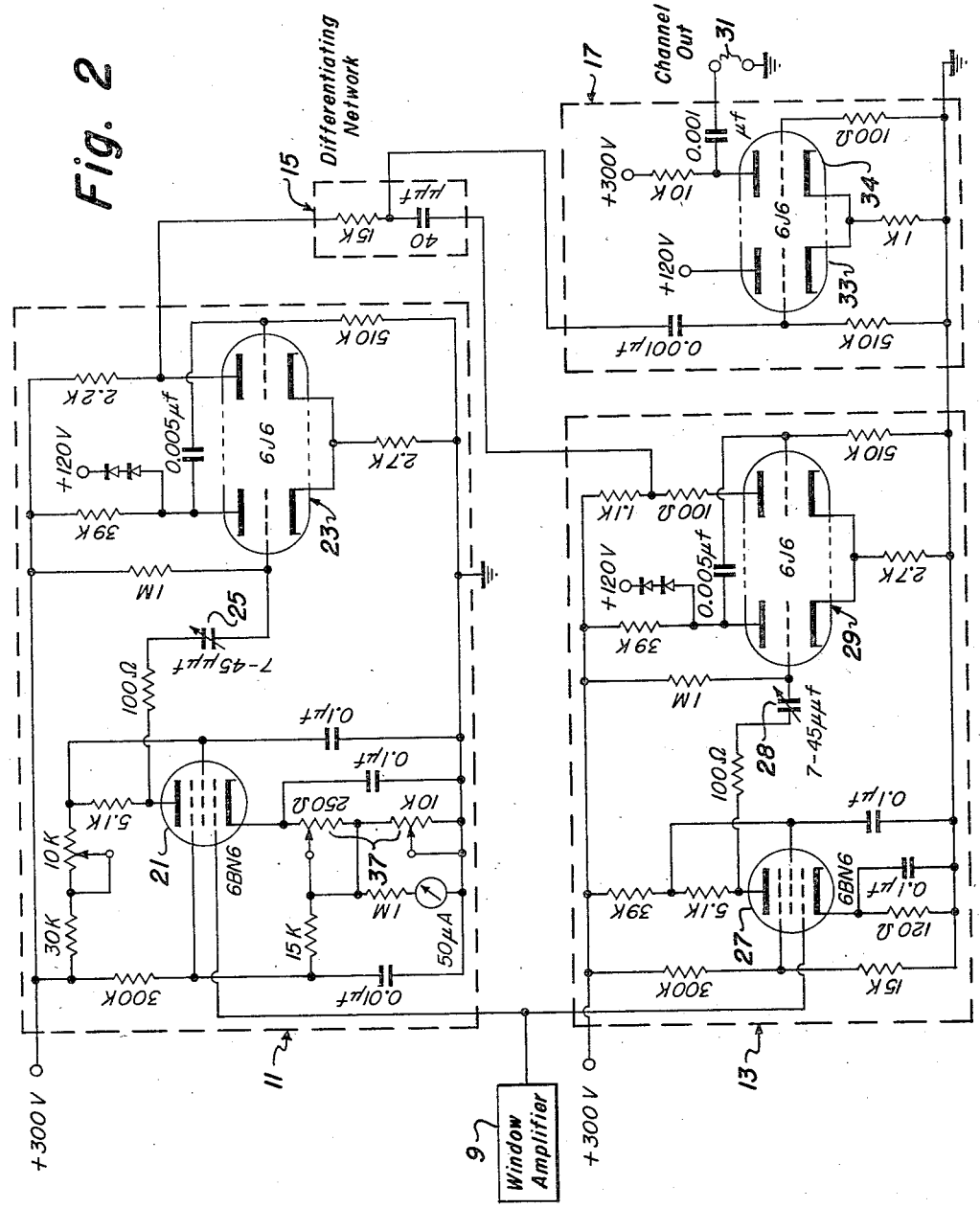
Figure 2 is a circuit schematic of the analyzer utilizing the anticoincidence circuit of this invention.

The arrangement of components and their inter-relation is shown in detail in Figure 2.

The components included in the block 9 constitute the input expander or window amplifier. The utilization of a window amplifier considerably increases the stability of discriminator threshold. When input pulses are impressed on two discriminators having a bias difference of, for example, one volt, the stability of discriminator threshold becomes of considerable importance. A relative drift in threshold of the discriminators of only 10 mv. changes the window width one percent. This difficulty is alleviated by preceding the discrimnators with a common biased-off expander amplifier, known in the art as a window amplifier. The window amplifier amplifies by a constant factor the top of pulses which exceed its threshold. The output of the window amplifier is coupled to the upper and lower discriminators 11 and 13 respectively. The upper discriminator comprises an input threshold tube 21 and a univibrator duo-triode 23. The output of the threshold tube 21 is coupled to the univibrator by an adjustable condenser 25.

The output of the window amplifier is also coupled to the lower level threshold input tube 27. The output of lower threshold tube 27 is coupled via adjustable condenser 28 to lower level univibrator duo-triode tube 29. The output side of the lower level univibrator couples to the free end of the condenser of the resistor-condenser differentiating network 15. The output connection of the differentiating network is coupled to the input of cut-off amplifier tube 33. The output of cut-off amplifier tube 33 is amplified by tube 34. The output of tube 34 is connected to an output terminal.

The threshold tube 21 of the upper level discriminator is provided with a bias-adjusting network 37. This enables the cut-off bias of this tube to be adjusted to a value such that pulses are passed which reach or exceed the selected threshold for the upper boundary of the channel. Therefore tube 21 will pass a pulse only when impressed with an input pulse which reaches the upper selected level of the channel. Upper threshold tube 21 couples through adjustable condenser 25 to upper level univibrator 23. The output of univibrator 23 is coupled to the free end of the resistor of the differentiating network 15.

The lower level threshold tube is provided with a bias determining network which allows the tube to pass pulses having a value equal to or exceeding the lower boundary of the channel.

It follows that the univibrator tube 29 will be activated by pulses which reach the lower selected boundary of amplitude, whereas the upper level univibrator 23 will be activated only if the pulses reach the selected upper boundary. All pulses which have amplitudes between these boundaries are effective in activating exclusively the lower level univibrator 29.

The differentiating network connecting the output of the lower and upper level discriminator univibrators is dimensioned to an RC product, including stray capacitance, of about one-third of the nominal univibrator pulse duration. The univibrators can be given any pulse duration selected value depending on the resolution desired and in any case should be at least as great as the over-all rise time of the input pulses to be analyzed. The upper level univibrator output is given a pulse amplitude of greater height preferably by at least a factor of 2 than the pulse amplitude of the lower level univibrator. The manner in which the upper and lower univibrator outputs are cancelled in the differentiating network is best seen on Figure 1. Waveform A indicates the output pulse of univibrator 29. Waveform B shows the differentiated form of the lower discriminator univibrator square waveform A. Waveform C shows the negative pulse of the upper level discriminator univibrator 23. Waveform D shows the mixed or combined waveform of the differentiated lower univibrator pulse and the upper univibrator pulse.

Waveform C generated by univibrator 23 is given an amplitude of greater than that of lower univibrator 29 by the utilization essentially of a load resistance in the output anode of univibrator 23 of twice the value of the output anode load resistor of univibrator 29. It is preferable that the upper univibrator waveform have at least twice the amplitude of the lower waveform in order that there be complete reliability in sufficient cancelling of the lower univibrator differentiated wavefrom positive pip.

The differentiated pulse output of the lower univibrator has a positive pip 30 which, in the case of an input pulse falling within the channel, overcomes the cut-off bias of amplifier 17 and thereby generates an output signal. This signal is available at the channel-out terminal 31.

If an input pulse reaches the upper boundary of the channel, the resulting waveform D lacks a positive component and so fails to activate biased-off amplifier 17.

Figure 3:
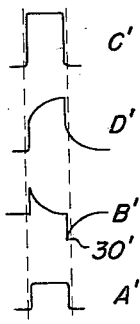
Figure 3 is a series of waveforms showing a second mode of operation of the invention.

As shown in Figure 3, the initial waveforms may be positive instead of negative. If both $A^1$ and $B^1$ waveforms are present, waveform D results and a negative pip $30^1$ is not formed. If only pulse $B^1$ is present, the differentiating network gives rise to negative pip $30^1$. A connection from the junction of the differentiating network to a biased-off diode or the cathode of a biased-off multi-element tube, or a multivibrator results in an output pulse only if lower pulse $A^1$ alone is generated.

It is apparent that devices which amplify or otherwise modify the amplitude but not the rectangular waveforms of univibrators 23 and 29 may be inserted as coupling devices between the univibrators and the differentiating network.

It follows from the foregoing description that an exceedingly simple but effective anticoincidence circuit has been invented. Numerous tubes which are utilized in the prior art for such purpose have been eliminated. The invention has been described with reference to a preferred embodiment but it is desirable that it be understood that this invention may be utilized in numerous modifications. For example, it is preferable that biased-off tube 33 be regarded as a gating device for it is apparent that many devices other than triodes are available in the art for such gating purposes. Further, although the univibrators are shown as utilized with threshold selecting devices, it is feasible to differently bias the univibrators themselves and still utilize the anticoincidence circuit of this invention. Accordingly, it is understood that the invention is to be construed as limited only by the scope of the appended claims taken in view of the prior art.

What I claim is:

1. An anticoincidence device for a pair of adjacent channels of a multi-channel pulse height analyzer for preventing the lower channel from generating a count pulse in response to an input pulse when the input pulse has sufficient magnitude to reach the upper level channel, comprising first and second square waveform generators, said generators having negative polarity and substantially equal pulse length generating characteristics, the first generator pulse having a greater magnitude than that of the second generator pulse, an RC network having a product in the neighborhood of one-third the waveform duration, the resistor end of said RC network being electrically coupled to the first waveform generator and the other end of said RC network being electrically coupled to the second waveform generator, a biased-off grid controlled thermionic device having its control electrode coupled to the common junction of said resistor and condenser and having its output electrically coupled to a terminal.

2. An anticoincidence apparatus for puse height analyzers comprising a selected lower level threshold electronic switching device, a lower level univibrator having its input coupled to said lower level switching device; an upper level threshold switching device, an upper level univibrator having a pulse generating magnitude greater than the pulse magnitude of the lower level univibrator and with a duration equal substantially to that of said lower level univibrator and having its input coupled to said upper level threshold device, a series connected resistance-capacitor network having an RC product equal substantially to one-third the univibrator pulse generating duration, and coupled with the resistor end to the upper level univibrator output and coupled with the capacitor end to the lower univibrator output, a biased-off output gating device, means electrically coupling the junction of the resistor and capacitor of the RC network to the input of the output gating device and an output terminal connected to the output of said gating device.

3. A pulse amplitude discriminating device comprising a first biased electronic switching device, a first univibrator capable of generating a negative rectangular pulse and having its input coupled to the output of said first switching device, a second biased electronic switching device having a smaller bias than that of said first biased switching device, a second univibrator capable of generating a negative rectangular pulse of smaller magnitude than that of the first univibrator and having a like period to the first univibrator, said second univibrator having its input coupled to the output of the second switching device, a serially connected resistor-capacitor network having a time constant of approximately one-third that of the pulse duration of the univibrators, the resistor end of said resistor-capacitor network being connected to the anode of the normally-off tube of said first univibrator, the capacitor end of said resistor-capacitor network being connected to the anode of the normally-off tube of the second univibrator, a third electronic switching device being biased to cut-off and having its input coupled to the junction of said third resistor and capacitor, whereby said third electronic switching device is actuated when only the lower univibrator is triggered and is not actuated when both said univibrators are triggered.

4. A device for determining the coincidence of activation of two pulse generators which generate substantially rectangular wave impulses of unequal amplitude, substantially equal duration and like polarity, comprising a series connected resistance and capacitance having an RC product of approximately one-third the duration of the rectangular wave impulses, means electrically coupling the resistor end of said series connected resistance and capacitance to the output of the pulse generator of pulses of greater amplitude, means electrically coupling the capacitor end of said series connected resistance and capacitance to the output of the other pulse generator, an electronic switching device, said electronic switching device being sensitive to a pulse of selected polarity, means electrically coupling the input of said switching device to the junction of said serially connected resistor and condenser; and an output terminal electrically coupled to the output of said switching device.

5. An amplitude discriminating device comprising two approximately equal duration square waveform generators; means responsive to an incoming pulse reaching a selected level for triggering a first one of said generators, means responsive to said incoming pulse reaching a second selected amplitude for triggering the second of said generators; said first generator being capable of generating a pulse having a magnitude of about twice the magnitude of the pulse capable of being generated by the second generator, a differentiating network comprising a resistor and a capacitor, means electrically coupling the capacitor to the output of the second one of said generators; means electrically coupling the resistor to the output of the first of said generators; a unidirectional conducting device, a cut-off bias impressed on said unidirectional conducting device; and means electrically coupling the junction of the resistor and capacitor to said unidirectional conducting device.

References Cited in the file of this patent
UNITED STATES PATENTS

| | | |
|---|---|---|
| 2,536,816 | Krumhansl | Jan. 2, 1951 |
| 2,551,529 | Davis | May 1, 1951 |
| 2,552,013 | Orpin | May 8, 1951 |
| 2,556,074 | Eberhard | June 5, 1951 |
| 2,561,772 | Atwood | July 24, 1951 |
| 2,575,087 | Baker | Nov. 13, 1951 |
| 2,600,919 | Pritchard | June 17, 1952 |
| 2,646,510 | Musselman | July 21, 1953 |
| 2,655,650 | Marshall | Oct. 13, 1953 |